Patented Mar. 9, 1926.

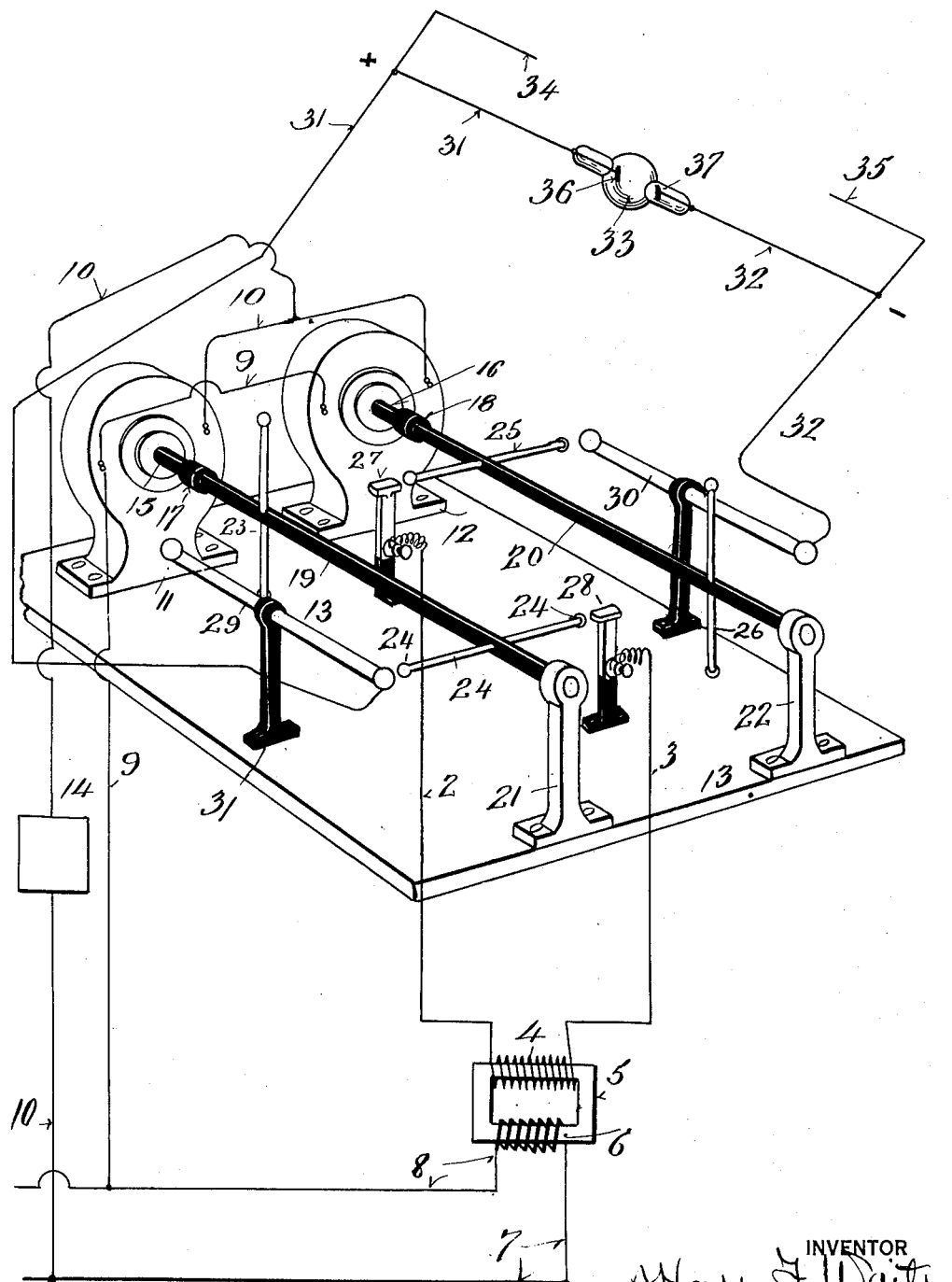

1,576,382

UNITED STATES PATENT OFFICE.

HARRY F. WAITE, OF NEW YORK, N. Y.

HIGH-TENSION RECTIFYING SWITCH.

Application filed June 25, 1921. Serial No. 480,441.

*To all whom it may concern:*

Be it known that I, HARRY F. WAITE, a citizen of the United States, and a resident of the city of New York, county of Queens, and State of New York, have invented a new and useful Improvement in High-Tension Rectifying Switches, of which the following is a specification.

Heretofore it has been common to make such switches so that they can rectify high tension currents from thirty thousand to one hundred and fifty thousand volts.

The object of my invention is to provide a switch of this character which can rectify currents of a much higher tension, say three hundred thousand volts, more or less. This object is accomplished by my invention, one embodiment of which is hereinafter more particularly set forth.

For a more detailed description of my invention, reference is to be had to the accompanying drawings, forming a part hereof, in which the figure is a perspective view, partially diagrammatic, showing my improved switch and the connections therewith.

In systems involving a high tension switch, it is common to use either an alternating or a direct current, as may be convenient. Where an alternating current is used a synchonous motor is employed and where a direct current is employed it is customary to use an inverse rotary which transforms the direct current into an alternating current. In the embodiment of my invention herein shown and described, an alternating current is employed, it being understood that corresponding changes will be made where a direct current is used.

My improved switch 1 has two high tension wires 2 and 3 respectively, which run to the high tension winding 4 of a transformer 5 which has its primary or low tension winding 6 connected to the lead in wires 7 and 8 in the conventional manner. These wires 7 and 8 are also connected by suitable wires 9 and 10 to a pair of synchronous motors 11 and 12 which are mounted on a common base 13. For starting these motors, the wire 10 has a starting box 14 in circuit in the conventional manner.

These motors 11 and 12 have parallel armatures 15 and 16, respectively, which run to insulation couplings 17 and 18 which carry the shafts 19 and 20 which have their other ends mounted in suitable supports 21 and 22, respectively, which rise from the base 13. The shafts 19 and 20 are preferably made of some insulating material and each shaft is provided with two cross conductors which are placed as indicated, at right angles, the shaft 19 carrying the cross conductors 23 and 24 and the shaft 20 carrying the cross conductors 25 and 26. These cross conductors are so arranged and disposed that they connect through two standards at the center with the two elongated standards at the sides, the center standards 27 and 28 being connected with the high tension wires 2 and 3, respectively, and the side standards 29 and 30 being connected with the high tension wires 31 and 32, respectively, which are connected to an X-ray tube 33 and the spark gap points 34 and 35 which may be mounted in any desired manner and are generally separated by a gap of something like twenty inches so as to provide for the high tension of the apparatus The standards 29 and 30 are mounted on the base 13 and are carefully insulated therefrom and the cross conductors 23, 24, 25 and 26 are insulated by their respective shafts 19 and 20. The X-ray tube 33 is a very large and powerful tube which has its anode 36 connected to the wire 31 and its cathode 37 connected to the wire 32.

In view of the foregoing, the operation of my improved apparatus will be readily understood. For the moment the terminal 28 is assumed to be positive and close to the cross conductor 24 through which electricity passes, after jumping the spark gap between the conductor 24 and upright 28, and from thence it jumps a second spark gap to the conductor 29 and from there passes through the wire 31 to the anode 36 and from there through the tube 33 to the cathode 37 and thence along the conductor 32 to the standard 30 and from there through the cross conductor 25 after jumping the spark gap and thence through the spark gap to the standard 27. As the motors 11 and 12 are synchronous motors, when the phase changes the cross conductors also change so that the wire 31 always has a positive connection and the wire 32 has a negative.

The gap between the uprights 27 and 28 should be more than twenty inches and so should the gap between the center standards 27 and 28 and the side standards 29 and 30 so that under no circumstances can the high tension current arc cross and short circuit the tube 33.

While I have shown and described some embodiments of my invention, it is obvious that it is not restricted thereto, but that it is broad enough to cover all structures that come within the scope of the annexed claim.

What I claim is:

In an alternating current rectifying switch for high tension currents, a pair of spaced, centrally located high tension standards, a pair of high tension standards located one at each side of the plane of the central standards, a pair of synchronously driven shafts, one between the said central standards and each side standard, each of which is provided with a pair of suitable cross conductors so arranged and disposed that on one side one of the central high tension standards is connected to one of the side standards while the other of said central high tension standards is connected to the other side standard so that each side standard will always have the same potential when the apparatus is in use and will be connected synchronously to the center standards and long spark gaps may be maintained so as to prevent a short circuiting of a tube or other device to which the switch is connected.

In testimony whereof, I have hereunto set my hand this 24th day of June, 1921.

HARRY F. WAITE.